United States Patent [19]
Woodside

[11] Patent Number: 5,588,077
[45] Date of Patent: Dec. 24, 1996

[54] IN-LINE, TWO-PASS, FIBER OPTIC ROTARY JOINT

[75] Inventor: Shane H. Woodside, Lower Sackville, Canada

[73] Assignee: Focal Technologies, Inc., Nova Scotia, Canada

[21] Appl. No.: 445,752

[22] Filed: May 22, 1995

[51] Int. Cl.$^6$ .................................................. G02B 6/26
[52] U.S. Cl. ................... 385/26; 385/25; 385/16
[58] Field of Search ................... 385/25, 26, 12, 385/16

[56] References Cited

U.S. PATENT DOCUMENTS

| | | |
|---|---|---|
| 4,398,791 | 9/1983 | Dorsey . |
| 4,519,670 | 5/1985 | Spinner et al. . |
| 4,643,521 | 2/1987 | Harstead et al. . |
| 4,725,116 | 2/1988 | Spencer et al. . |
| 4,834,484 | 5/1989 | Gorman et al. . |
| 4,842,355 | 6/1989 | Gold et al. . |
| 4,961,622 | 10/1990 | Gorman et al. . |
| 5,039,193 | 8/1991 | Snow et al. ............................. 385/25 |
| 5,073,040 | 12/1991 | Guinard . |
| 5,157,745 | 10/1992 | Ames . |
| 5,298,741 | 3/1994 | Walt et al. .............................. 385/12 |
| 5,444,801 | 8/1995 | Laughlin ................................. 385/16 |

FOREIGN PATENT DOCUMENTS 215973A  4/1987  European Pat. Off. ............... 385/26

*Primary Examiner*—John D. Lee
*Assistant Examiner*—Yisun Song
*Attorney, Agent, or Firm*—Jones, Tullar & Cooper, P.C.

[57] ABSTRACT

An especially compact optical rotary joint for use with fiber optic cables is set forth including three embodiments capable of transferring two data streams each carried on a separate optical fiber. The rotary joint is constructed with a stationary portion and a relatively rotating portion. The two optical fiber channels are arranged in-line along the same rotational axis. Isolation of one channel from the other is achieved through a novel application of gradient index rod lenses of suitable pitch. A pair of lenses is arranged adjacent each other on each side of the rotational interface and a second pair of axially aligned lenses is arranged outboard of the first pair. An optical signal from one of the outboard lenses can be directed to one of the other lenses depending on the pitch selection. Losses due to crosstalk or overlap of the signal paths is within acceptable limits. Both channels are bidirectional, i.e., each can carry signals in either direction.

10 Claims, 3 Drawing Sheets

Rotational Interface
(Plane of Separation)

☐ Channel A

▨ Channel B

☐ Channel A

▨ Channel B

── Channel A

▨ Channel B

Section A-A

IN-LINE, TWO-PASS, FIBER OPTIC ROTARY JOINT

The present invention relates to fiber optic rotary joints in general and to a two-channel fiber optic rotary joint in particular.

BACKGROUND OF THE INVENTION

The properties of optical fiber make it an ideal medium for carrying signals in an ever-increasing number of applications. These properties include high bandwidth, i.e., signal-carrying capacity, immunity to interference, low loss, light weight and low bulk. Optical fiber is often used in conjunction with electrical leads which carry power, such as in the cables of many remotely operated systems. Undersea robots for tasks such as pipeline inspection, networked rotating industrial workstations, wireline logging systems for downhole measurements in wells, and material handling applications are examples of such systems. The cable is normally handled by a winch or reel. This requires a slip ring or rotary joint assembly to permit the paying out or retraction of the cable without interrupting signal connection to the remote system.

Slip rings for electrical wires are well established, but fiber optic rotary joints are much more recent developments. In many fiber optic systems more than one fiber is needed, for redundancy, bandwidth, or system cost considerations. Two is often the optimal number of fibers, such as in duplex networks or installations demanding a spare channel. Yet rotary joints for more than one fiber are not developed to an adequate state for many applications. Prior inventions require complex assemblies which variously employ optical components such as prisms, mirrors, cuspated lenses, axicons, infinite focal length ring lenses, or eccentric lenses, and mechanical elements such as gears and magnets. Consequently, commercially available multiple channel fiber optic rotary joints can be too large or delicate for some applications, or too costly for others. In addition to the kinds of applications listed above, a sufficiently small fiber optic rotary joint can be retrofitted into many existing installations such as antennas, turrets and winches. This permits the continued use of existing slip ring assemblies, greatly enhancing system operation at minimal cost. A fiber optic rotary joint which shares the miniature, low cost and robust characteristics of a single channel fiber optic rotary joint while accommodating at least two fibers could satisfy these applications.

A search has uncovered a number of US patents describing multiple channel fiber optic rotary joints, namely:

| | |
|---|---|
| 4,519,670 Spinner et. al. | LIGHT-ROTATION COUPLING FOR A PLURALITY OF CHANNELS |
| 4,643,521 Harstead et. al. | PLURAL-CHANNEL OPTICAL ROTARY JOINT |
| 4,725,116 Spencer et. al. | MULTIPLE PASS OPTICAL ROTARY JOINT |
| 4,834,484 Gorman et. al. | OPTICAL FIBER COUPLER INCLUDING REFRACTIVE MEANS FOR PRODUCING AN ANNULAR BEAM |
| 4,961,622 Gorman et. al. | OPTICAL COUPLER AND REFRACTIVE LAMP |
| 4,842,355 Gold et. al. | MULTICHANNEL OPTICAL ROTARY JOINT FOR WELL LOGGING USAGE |
| 5,073,040 Guinard | MECHANO-OPTICAL DEVICE, IN PARTICULAR A ROTARY OPTICAL JOINT |
| 5,157,745 Ames | MULTI-CHANNEL FIBER OPTICAL ROTARY JOINT FOR SINGLE-MODE FIBER | and one U.S. patent on single channel fiber optic rotary joints:

| | |
|---|---|
| 4,398,791 | Dorsey |

BRIEF DESCRIPTION OF THE INVENTION

The patents listed above describe various types of fiber optic rotary joints but they do not address the problem of two-channel on-axis signal transmission. It would be desirable to have a rugged, reliable, simple, small, two-channel, passive fiber optic rotary joint suitable for use in demanding applications. The present invention requires only simple lenses and transparent fiber holders held within a standard shaft and housing arrangement to achieve efficient, continuous and bidirectional optical coupling of two fiber optic channels across a rotatable interface, demonstrating obvious improvements in miniaturization and cost efficiency over previous disclosures.

The present invention comprises a two-pass, in-line fiber optic rotary joint that is particularly compact. Several embodiments offering different trade-offs between insertion loss (static loss and rotational variation), inter-channel crosstalk and cost are possible. With this invention, two optical channels share the rotational axis of the device, and channel separation occurs due to the separation of the focal points of the two channels; i.e., when one channel is focussed, the second is collimated, and vice versa. In two of the three configurations, the two optical channels use common lenses (the inner lenses) for different purposes. For example, a given lens may act as a collimating element for one channel while simultaneously serving as a focussing element for the other channel. The lenses shown are of the gradient-index rod type which are widely used in the art, but other lenses could be used as well.

In summary of the above, the present invention may be considered as providing a method of transmitting optical signals along two optical channels across a fiber optic rotary joint, comprising the steps of: (a) in a rotary joint including a rotating side and a stationary side, connecting first-channel optical fibers with a pair of axially aligned opposing lenses which transmit light between the rotary and stationary sides thereof; and (b) inserting second-channel optical fibers between the lenses of the first-channel fibers, aligned to transmit light between the rotating and stationary sides of the rotary joint; wherein channel separation occurs due to the separation of the focal points of the two channels.

Furthermore, this invention contemplates a two-channel fiber optic rotary joint for transmission of optical signals, comprising: (a) a rotational portion aligned with a stationary portion, having a rotational axis extending therealong, and a plane of separation between the rotational and stationary portions; (b) means for mounting first and second optical fibers in the rotational portion, spaced apart along the axis; (c) means for mounting third and fourth optical fibers in the stationary portion, spaced apart along the axis; (d) means for optically coupling light between the first optical fiber and one of the third or fourth fibers; (e) means for optically coupling light between the second optical fiber and the other of the third or fourth fibers; and (f) the mounting means and the coupling means positioned in the rotational portion on one side of the plane of separation being a mirror image of the mounting means and the coupling means positioned in the stationary portion on the other side of the plane of separation.

BRIEF DESCRIPTION OF THE DRAWINGS

In order to demonstrate the above-mentioned features and advantages of the present invention, reference is made to the details provided in the appended drawings. It is to be noted, however, that the appended drawings illustrate only typical embodiments of this invention and are therefore not considered limiting of its scope, for the invention may admit to other equally effective embodiments.

DETAILED DESCRIPTION OF THE PREFERRED EMBODIMENTS

Figure 1:
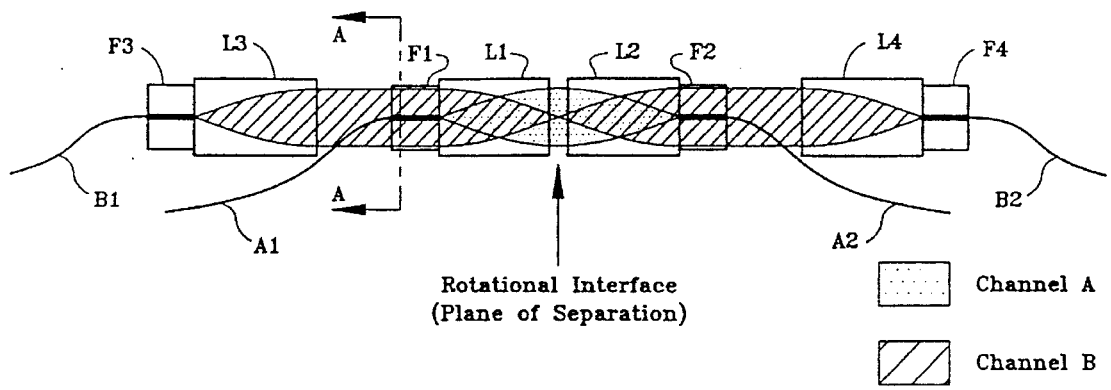
FIG. 1 is a schematic drawing showing a longitudinal section of a two-channel rotary joint according to the concepts of the present invention.

Referring initially to FIG. 1, a two-channel optical rotary joint according to the concepts of the present invention is illustrated schematically in longitudinal cross section. Details of the mechanical arrangement are omitted for the sake of simplicity. The rotational interface, or plane of separation, is in the center, between lenses L1 and L2. Either side may be considered the rotating portion (rotor) and the other the stationary portion (stator). L1, L2, L3 and L4 are axially aligned collimating lenses with a radially varying index of refraction, commonly referred to as GRIN lenses. The length and gradient index profile of these lenses is such that at the wavelength of interest, the light from an optical fiber placed at the back of one such lens is expanded and collimated. Such a lens is said to have a pitch of ¼ or 0.25. A collimated beam which impinges upon an identical lens will come to a focus at the opposite end of the lens, and thus may be efficiently collected by another optical fiber. By this means, fiber A1 is coupled to fiber A2 by lenses L1 and L2 to form the inner optical pass, Channel A. A representative optical beam is shown as dotted, illustrating the collimation and refocussing described above. This is the principle employed in several single-channel rotary joints, such as that of Dorsey. F1 and F2 are optically transparent ferrules, used as fiber holders. They are constructed from a material such as fused silica or quartz.

The novelty in the present invention is in the provision of a second optical channel. Lenses L3 and L4 are added to couple optical Channel B. Ferrules F3 and F4 are used to hold fibers B1 and B2 respectively, as in the case of the inner channel A, although F3 and F4, being on the outside, need not be transparent. Like lenses L1 and L2, lenses L3 and L4 are of ¼ pitch. The beam of Channel B, shown as hatched, is focussed or contracted at the rotational interface, in contrast to the beam of Channel A, which is expanded and collimated at that point. Crosstalk, i.e., coupling from one channel to the other, is minimized because the portion of the light beam from Channel B which would otherwise be coupled to a given fiber of Channel A is masked by the opposing fiber of Channel A.

Figure 4:
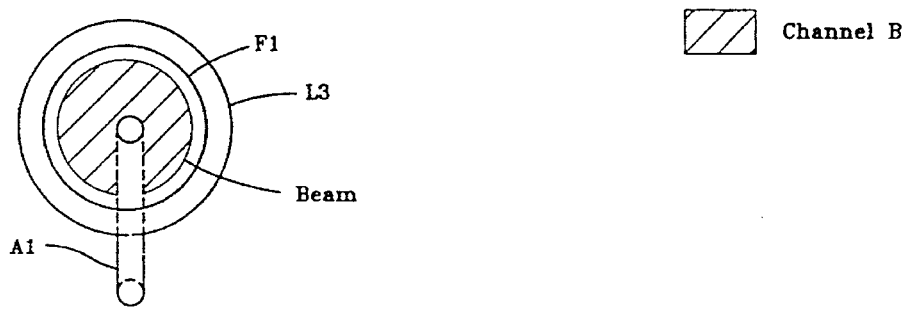
FIG. 4 is a diametrical section drawing of the invention through one of the inner ferrules.

The outer pass, Channel B, uses all four lenses and hence experiences a loss due to the partial occlusion of its beam by fibers A1 and A2, hereafter referred to as shadow loss. This is shown in FIG. 4, wherein the hatched circle indicates the optical beam, which is partially blocked by the fiber. In addition, Channel B is as sensitive to lateral offset between rotor and stator as is a butt-coupled fiber pair (unlike the collimated beam of Channel A which is more tolerant to lateral offset). However, since the fibers for B1 and B2 are on the outside of the assembly, their positions are easily adjusted during assembly to correct for any such mechanical offset. Channel A does not experience a shadow loss, so for this embodiment there is a lower insertion loss channel (A) and a higher insertion loss channel (B).

It will also be noticed that there is symmetry in the disclosed configuration in that the assembly of lenses, fibers and ferrules on the rotational side of the plane of separation, or rotational interface, is the mirror image of the assembly of lenses, fibers and ferrules on the stationary side. This feature of symmetry applies to the alternative embodiments to be described hereinafter.

Prototypes of the embodiment shown in FIG. 1 have been constructed with positive results from testing for optical insertion loss, crosstalk, lifetime (number of rotations) and temperature stability (optical insertion loss as a function of temperature).

Figure 2:
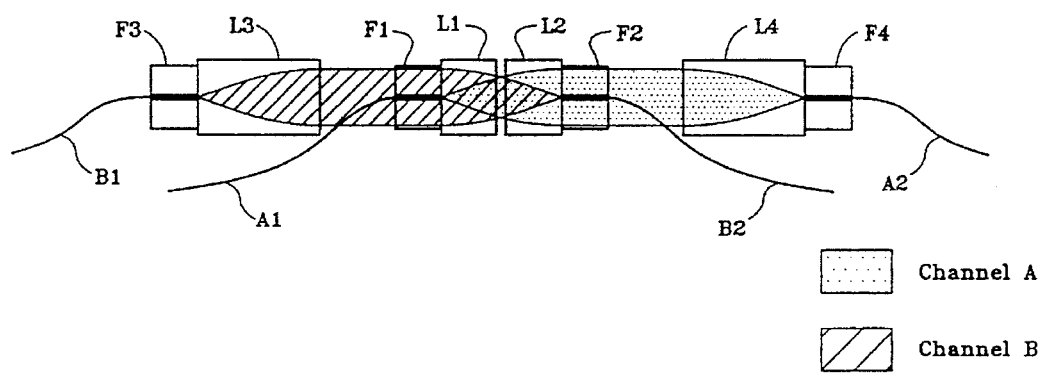
FIG. 2 is a schematic drawing of a different embodiment wherein the two optical channels are interleaved.

Referring now to FIG. 2, an embodiment of the present invention is shown schematically wherein the two optical passes are interleaved. That is, the inner fiber on one side of the central rotational interface is focussed to the outer fiber on the other side. The optical beam of Channel A is depicted by the dotted area, while that of Channel B is shown by a hatched pattern. By appropriate choice of GRIN lenses L1 and L2 (<⅛ pitch), a greater spacing between rotor and stator can be achieved than would be possible with a butt-coupled fiber pair. In this case lenses L1 and L2, spaced appropriately, are equivalent to a single ¼ pitch lens. There is a shadow loss in both channels in this embodiment, caused by the partial blocking of each beam by one of the fibers from the other channel. Channels A and B are symmetrical and thus their optical insertion loss is commensurate. Crosstalk is greater than in the first embodiment, because there is no beneficial masking effect of the type described above. The degree of crosstalk can be estimated by the ratio of the fiber sectional area to that of the beam of the other channel, and was measured at −24 to −30 dB in prototypes.

Figure 3:
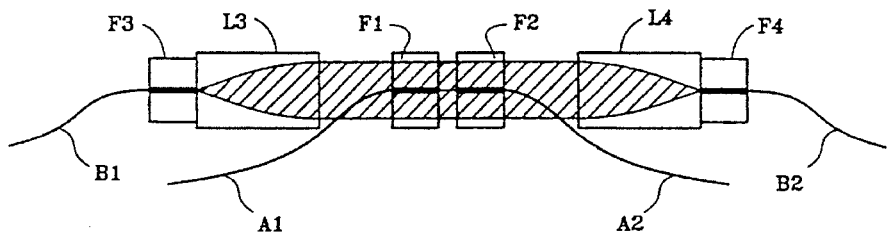
FIG. 3 is a schematic drawing of a third and simpler embodiment.

Referring now to FIG. 3, a third embodiment is shown schematically. In this case the inner Channel A is actually a butt-coupled fiber pair employing no lenses. Due to its small size, the beam of Channel A is shown as a thin line. In butted joints of this type, some spacing or gap between the fiber ends must be maintained in order to allow relative motion without contact. For efficient coupling this gap must be not more than several times the core diameter of the optical fibers. In addition, Channel A is very sensitive to lateral positioning accuracy compared to Channel B.

The beam of Channel B, shown hatched, passes through the optically transparent ferrules F1 and F2 which hold the fibers of Channel A. There is the same type of shadow effect as described for the other embodiments, wherein the fibers A1 and A2 partially obscure the beam of Channel B, contributing to a loss of signal in Channel B. Proper choice of lenses ensures that the proportion of loss in Channel B due to shadowing is acceptably low (i.e., the expanded beam diameter is large relative to that of the fiber). The degree of crosstalk in this embodiment is low, as in FIG. 1, because of the beneficial masking effect of the two inner fibers.

Figure 3A:
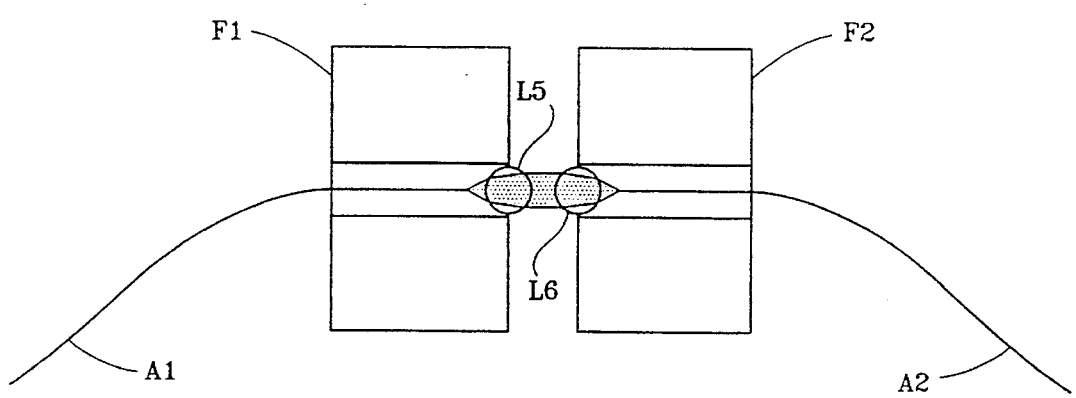
FIGS. 3a and 3b are enlarged views of alternative configurations at the plane of separation.
Figure 3B:
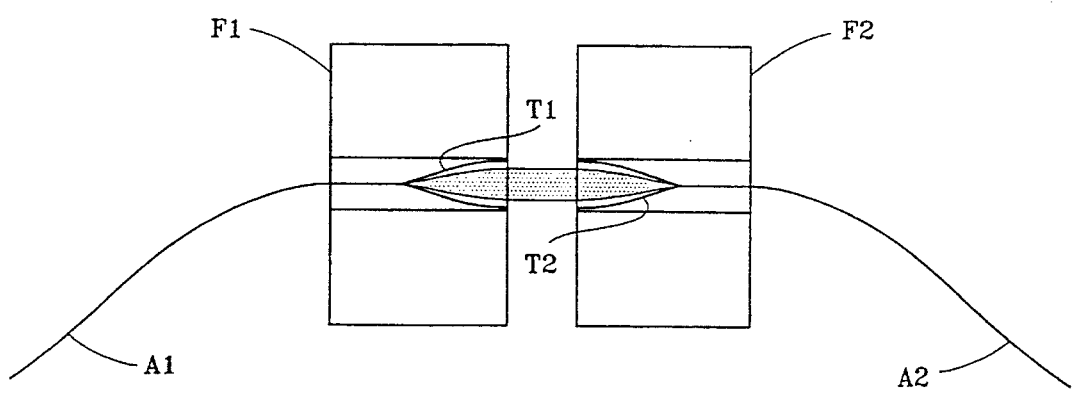

Modifications of this configuration as shown in figures 3a and 3b would include the addition of spherical micro-lenses L5, L6 (or similar lenses) between F1 and F2, or fiber tapers T1, T2 within ferrules F1 and F2, thereby decreasing the sensitivity of Channel A to lateral offset, increasing the allowable rotor-stator separation and improving the loss in Channel A. The loss in Channel B would be degraded due to a larger shadow effect.

Partial reflection of an optical beam occurs at interfaces at which there is a stepwise change in the index of refraction, with the amount of reflection increasing for larger steps in the index of refraction. For example, a collimated beam impinging a glass/air or air/glass interface will suffer a reflection of about 4 to 5%. Such reflections decrease the transmitted signal, thereby increasing the optical insertion loss of a fiber optic rotary joint. Reflections are also undesirable because they can cause instabilities in the light sources used in fiber optic systems, most notably with semiconductor lasers. Referring again to FIG. 1, it can be seen that there are many interfaces at which reflections can occur, in particular for Channel B. To reduce these reflections, index-matching epoxies can be employed between the fiber ferrules and the lenses, and anti-reflection layers can be placed on any or all free optical surfaces, i.e., those surfaces at the end faces of all lenses, ferrules and fibers which share an interface with air (a poor index match) and which are intersected by the optical beams.

Figure 5:
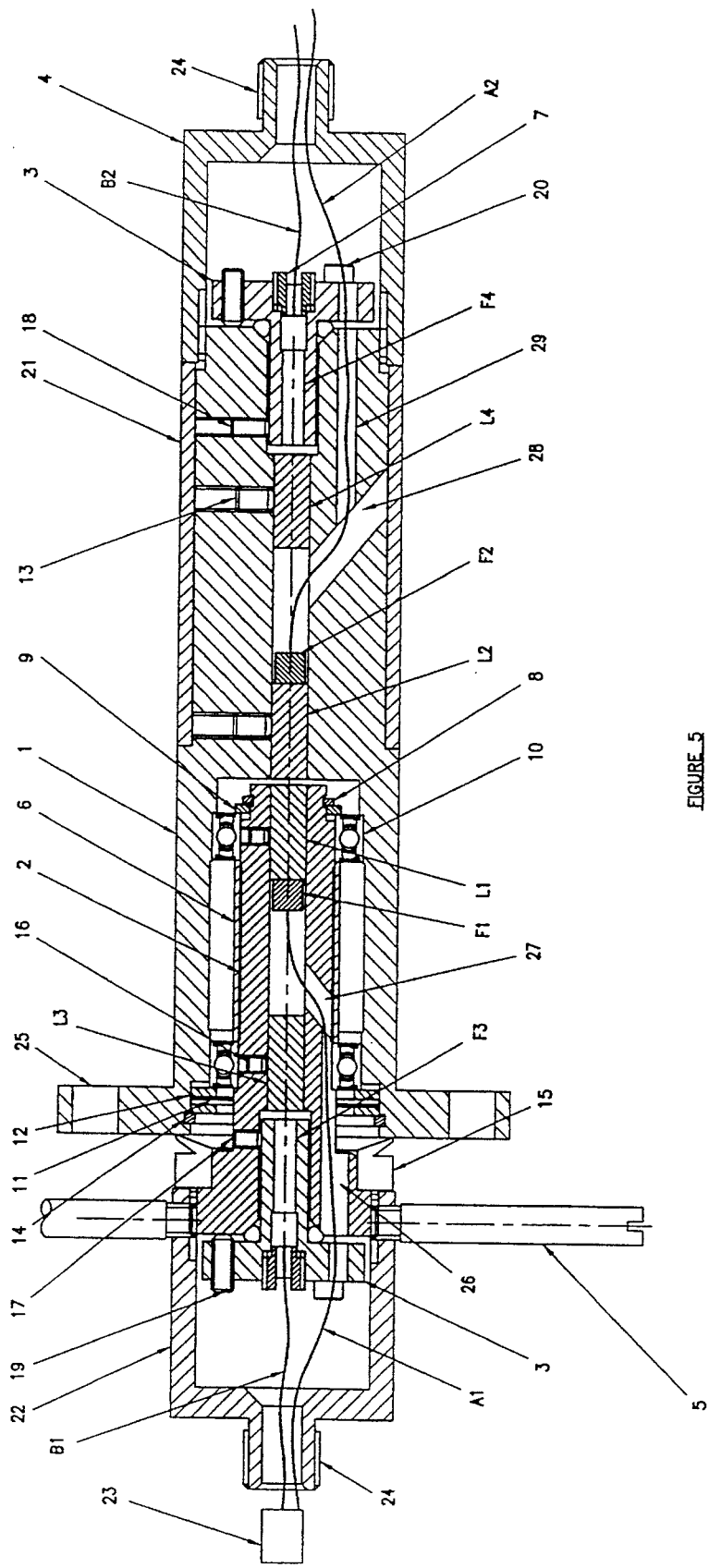
FIG. 5 is a longitudinal section drawing of the invention, showing more details of mechanical construction.

Referring now to FIG. 5, a longitudinal cross-sectional view is provided to show the mechanical details of a typical embodiment of the present invention. The optical components are given the same designations as in FIG. 1 for ease of understanding. The rotor 22 and inner housing 2 are allowed to rotate relative to the body 1 by the bearings 10. The input fiber optic cable 23 having two optical fibers A1 and B1 therein is illustrated entering the rotor 22. The corresponding fiber optic cable containing fibers A2 and B2 exits the rotary joint at the other end. The fiber cables may be attached to the rotary joint mechanically by means of connectors or the fibers may enter and exit separately in the form of flying leads or pigtails. The threaded bosses 24 shown at the extremities of the rotor 22 and the strain relief 4 could be used for such connectors or to anchor fittings permitting the attachment of conduit to protect such pigtails. Together with the V-ring 15, these features permit the assembly to be sealed. These attachment and sealing details are well known in the trade and not considered a unique component of the present invention.

The ferrule adjusters 3 permit adjustment of the positions of the outer fibers, relative to lenses L1 and L2, to correct for mechanical offsets. The torque arm 5 allows the rotor 22 to be driven relative to the body 1 which is mounted by means of the contiguous bolting flange 25 shown. The spacer 6, together with the retaining rings 8 and 14, bearing shim 9, wavespring 11 and retaining plate 12, position the bearings 10 around the inner housing 2. The ferrule holders 7 position the outer ferrules of Channel B. The fibers in Channel A, A1 and A2, are routed through the slots 26–29 shown in the body 1 and inner housing 2. The set screws and cap screws items 13 and 16–20 perform attachment and adjustment functions and the sleeve 21 forms part of the outer enclosure between the body 1 and strain relief 4.

The embodiments of the invention in which an exclusive property of privilege is claimed are defined as follows:

1. A method of transmitting optical signals along two optical channels across a fiber optic rotary joint, comprising the steps of:
   (a) in a rotary joint including a rotational side and a stationary side, connecting first-channel optical fibers with a pair of axially aligned opposing lenses which transmit light between the rotational and stationary sides thereof; and
   (b) inserting second-channel optical fibers between the lenses of the first-channel fibers, aligned to transmit light between the rotating and stationary sides of the rotary joint, so that the light of the second channel will occupy the same physical space as the light of the first channel; and
   (c) wherein channel separation occurs due to the separation of the focal points of the two channels.

2. A two-channel fiber optic rotary joint for transmission of optical signals, comprising:
   (a) a rotational portion aligned with a stationary portion, having a rotational axis extending therealong, and a plane of separation between said rotational and stationary portions;
   (b) means for mounting first and second optical fibers in said rotational portion, spaced apart along said axis;
   (c) means for mounting third and fourth optical fibers in said stationary portion, spaced apart along said axis;
   (d) means for optically coupling first channel light between said first optical fiber and one of said third or fourth optical fibers;
   (e) means for optically coupling second channel light between said second optical fiber and the other of said third or fourth fibers so that said second channel light shares the same physical space as said first channel light; and
   (f) the mounting means and the coupling means positioned in said rotational portion on one side of said plane of separation being a mirror image of the mounting means and the coupling means positioned in said stationary portion on the other side of said plane of separation.

3. The rotary joint of claim 2 wherein each of said coupling means includes a graded index (GRIN) rod lens connected to each of said fibers, the lenses connected to said second and third fibers being closest to said plane of separation and said mounting means for such fibers being optically transparent, the lenses connected to said first and fourth fibers being in one of said first or second optical channels, the lenses connected to said second and third fibers being part of both optical channels, each of said lenses being nominally ¼ pitch so that an optical beam of the other of said channels is fully expanded and collimated at said plane of separation and an optical beam of said one of said channels is focused at said plane.

4. The rotary joint of claim 3 wherein each of said mounting means is an optically transparent ferrule abutting an adjacent GRIN lens at an end thereof away from said plane of separation.

5. The rotary joint of claim 2 wherein each of said coupling means includes a graded index (GRIN) rod lens connected to each of said fibers, the lenses connected to said second and third fibers being closest to said plane of separation and said mounting means for such fibers being optically transparent, the lens connected to said first fiber being in one of said first or second optical channels, the lens connected to said fourth fiber being in the other of said channels, and the lenses connected to said second and third fibers being part of both optical channels, each of the lenses connected to said first and fourth fibers being nominally ¼ pitch, and the lenses connected to said second and third fibers being of or less than ⅛ pitch so that an optical beam of each of said channels is neither fully expanded nor fully focused at said plane of separation.

6. The rotary joint of claim 5 wherein each of said mounting means is an optically transparent ferrule abutting an adjacent GRIN lens at an end thereof away from said plane of separation.

7. The rotary joint of claim 2 wherein said coupling means includes a graded index (GRIN) rod lens connected to each of said first and fourth fibers, being in one of said first or second optical channels and being of nominally ¼ pitch, and wherein said mounting means for each of said second and third fibers includes an optically transparent ferrule therefor, with said second and third fibers being in the other of said channels, whereby an optical beam of said one channel is expanded and collimated at said plane of separation and the end of said second and third fibers is located very close to said plane of separation.

8. The rotary joint of claim 7 wherein said mounting means for each of said first and fourth fibers is an optically transparent ferrule abutting the adjacent GRIN lens at an end thereof away from said plane of separation.

9. A two-channel optical rotary joint for transmission of optical signals, comprising:
   (a) a rotational portion aligned with a stationary portion, having a rotational axis extending therealong, and being mechanically adapted for connection into a cable handling system;
   (b) a first optical transmission channel having:
      a first graded index (GRIN) rod lens mounted on said axis in said rotational portion;
      a first optically transparent ferrule mounting an associated first optical fiber adjacent said first lens;
      a fourth GRIN lens mounted on said axis in said stationary portion;
      a fourth optically transparent ferrule mounting an associated fourth optical fiber adjacent said fourth lens; and
      means for aligning said first channel lenses along said optical axis for optical coupling therebetween; and
   (c) a second optical transmission channel having:
      a second GRIN lens mounted on said axis in said rotational portion;
      a second optically transparent ferrule mounting an associated second fiber adjacent said second lens;
      a third GRIN lens mounted on said axis in said stationary portion;
      a third optically transparent ferrule mounting an associated third optical fiber adjacent said third lens; and
      means for aligning said second channel lenses for transmission of optical signals therebetween;
   (d) said lenses and ferrules of said second optical channel being positioned between said first channel lenses to achieve an in-line configuration of said channels.

10. The rotary joint of claim 9 wherein each of said GRIN lenses is nominally ¼ pitch so that an optical beam of said first optical channel is fully expanded and collimated at a plane of separation between said second channel lenses and an optical beam of said second channel is focused at said plane of separation.

* * * * *